United States Patent
Morisawa et al.

(10) Patent No.: US 10,578,024 B2
(45) Date of Patent: Mar. 3, 2020

(54) IGNITION DEVICE AND GAS TURBINE COMBUSTOR

(71) Applicant: Toshiba Energy Systems & Solutions Corporation, Kawasaki-shi (JP)

(72) Inventors: Yuichi Morisawa, Yokohama (JP); Yasunori Iwai, Yokohama (JP); Masao Itoh, Yokohama (JP); Iwataro Sato, Hiratsuka (JP)

(73) Assignee: Toshiba Energy Systems & Solutions Corporation, Kawasaki-shi (JP)

( * ) Notice: Subject to any disclaimer, the term of this patent is extended or adjusted under 35 U.S.C. 154(b) by 318 days.

(21) Appl. No.: 15/694,171

(22) Filed: Sep. 1, 2017

(65) Prior Publication Data
US 2018/0023478 A1    Jan. 25, 2018

Related U.S. Application Data

(63) Continuation of application No. PCT/JP2015/001106, filed on Mar. 3, 2015.

(51) Int. Cl.
*F02C 7/266*    (2006.01)
*H01T 13/08*    (2006.01)
(Continued)

(52) U.S. Cl.
CPC .............. *F02C 7/266* (2013.01); *F23R 3/002* (2013.01); *F23R 3/10* (2013.01); *F23R 3/28* (2013.01); *H01T 13/08* (2013.01)

(58) Field of Classification Search
CPC .......... F02C 7/264; F02C 7/266; H01T 13/08; H01T 13/24
See application file for complete search history.

(56) References Cited

U.S. PATENT DOCUMENTS 3,911,672 A * 10/1975 Irwin ...................... F02C 7/266
                                                      60/796
4,903,476 A *  2/1990 Steber ..................... F02C 7/266
                                                      431/264
(Continued)

FOREIGN PATENT DOCUMENTS

JP        4-279733       10/1992
JP       6-28232 U        4/1994
(Continued)

OTHER PUBLICATIONS

International Search Report dated Jun. 9, 2015 in PCT/JP2015/001106, filed on Mar. 3, 2015 (with English Translation).
(Continued)

*Primary Examiner* — William H Rodriguez
(74) *Attorney, Agent, or Firm* — Oblon, McClelland, Maier & Neustadt, L.L.P.

(57) ABSTRACT

An ignition device of an embodiment is provided to a gas turbine combustor to which supercritical-pressure $CO_2$ is introduced. The ignition device includes: a shutoff valve provided on an outer side face of a casing of the combustor to make the inside of the casing and the outside of the casing communicate with each other or shut off from each other; an ignition rod formed of a long rod including a spark discharge portion at a leading end, and capable of advancing to and retreating from the inside of a combustor liner provided in the casing from/to the outside of the casing through the shutoff valve; and a driving part which makes the ignition rod advance and retreat.

4 Claims, 5 Drawing Sheets

(51) Int. Cl.
*F23R 3/00* (2006.01)
*F23R 3/10* (2006.01)
*F23R 3/28* (2006.01)

(56) References Cited

U.S. PATENT DOCUMENTS

| | | | | |
|---|---|---|---|---|
| 6,438,940 | B1* | 8/2002 | Vacek | F02C 7/266 |
| | | | | 60/204 |
| 6,442,929 | B1* | 9/2002 | Kraft | F02C 7/266 |
| | | | | 313/145 |
| 2005/0072163 | A1* | 4/2005 | Wells | F02C 7/264 |
| | | | | 60/796 |
| 2013/0195546 | A1* | 8/2013 | Ponziani | F23R 3/60 |
| | | | | 403/327 |
| 2014/0352323 | A1* | 12/2014 | Bennett | F02C 7/28 |
| | | | | 60/799 |
| 2018/0252164 | A1* | 9/2018 | Huang | F02C 7/28 |

FOREIGN PATENT DOCUMENTS

| | | |
|---|---|---|
| JP | 8-213148 | 8/1996 |
| JP | 2008-57417 | 3/2008 |

OTHER PUBLICATIONS

Written Opinion dated Jun. 9, 2015 in PCT/JP2015/001106, filed on Mar. 3, 2015.

* cited by examiner

IGNITION DEVICE AND GAS TURBINE COMBUSTOR

CROSS-REFERENCE TO RELATED APPLICATIONS

This application is a continuation of prior International Application No. PCT/JP2015/001106 filed on Mar. 3, 2015; the entire contents of all of which are incorporated herein by reference.

FIELD

Embodiments disclosed herein relate generally to an ignition device and a gas turbine combustor.

BACKGROUND

Recently, studies have been made on a gas turbine facility in which $CO_2$ in exhaust discharged from a turbine is partly circulated to a combustor. In this gas turbine facility, studies have been made on achieving a thermal power generation system that performs power generation simultaneously with the separation and recovery of $CO_2$.

In this highly environmental-conscious gas turbine facility, studies have been made on a thermal power generation system in which, for example, oxygen is used as an oxidant and supercritical-pressure $CO_2$ is circulated to a combustor. This thermal power generation system achieves no-emission of NOx by effectively using $CO_2$.

In this thermal power generation system, for example, a fuel (natural gas or methane) and the oxidant (mixture of oxygen and $CO_2$) are introduced into the combustor to be combusted, and $CO_2$ as a cooling medium is also introduced to the combustor. Then, a turbine is rotated by high-temperature combustion gas generated by the combustion to generate electricity. The combustion gas ($CO_2$ and vapor) discharged from the turbine is cooled by a heat exchanger and is then deprived of the moisture to become $CO_2$. This $CO_2$ is compressed into high-pressure $CO_2$ by a high-pressure pump. Most of the high-pressure $CO_2$ is heated by the heat exchanger and is circulated to the combustor. The rest of the high-pressure $CO_2$ is recovered to be used for other purposes.

In the combustor in this thermal power generation system, mixed gas of the fuel and the oxidant mixed in the combustor is ignited using an ignition device. At the time of the ignition, a flow rate of the oxidant and a flow rate of the fuel are set low in order to reduce a sudden heat load to devices. Then, after the ignition, the flow rate of the oxidant is increased, thereby increasing the pressure in the combustor, and the flow rate of the fuel is increased, thereby increasing the temperature of the combustion gas in the combustor. The pressure in the combustor is thus increased up to, for example, a rated load condition of the turbine, for instance.

A typical ignition method in a conventional gas turbine combustor is to use spark discharge caused by the application of voltage to an ignition device disposed on a wall surface of the combustor. A leading end of the ignition device where the spark discharge occurs is exposed to flame after the ignition.

As a solution to this, studies have been made on a structure to make the ignition device advance/retreat into/from the combustor, from a viewpoint of durability and the like of the ignition device. This ignition device is made to advance/retreat into/from the combustor by, for example, an air cylinder using air jetted from a compressor. Then, after the ignition, the leading end of the ignition device, which is a spark discharge portion, is pulled out from the inside of the combustor. At this time, the leading end of the ignition device is pulled out up to, for example, an insertion hole which is formed in a combustor liner to allow the ignition device to advance/retreat therethrough, or pulled out up to a position between the combustor liner and a casing.

In the above-described thermal power generation system using the supercritical-pressure $CO_2$, the pressure at the turbine rated load in the combustor is ten times or more as high as that in the conventional gas turbine combustor. If the conventional structure of the ignition device is used, the leading end of the ignition device is exposed to this high-pressure condition even after pulled out from the inside of the combustor.

This high-pressure condition greatly exceeds a withstand pressure specification of the ignition device in the conventional gas turbine combustor. This does not permit the specification of the conventional ignition device to be applied as it is to the thermal power generation system using the supercritical pressure $CO_2$.

DETAILED DESCRIPTION

Embodiments of the present invention will be hereinafter described with reference to the drawings.

An ignition device of an embodiment is provided to a gas turbine combustor to which a working fluid is introduced. This ignition device includes: a shutoff valve provided on an outer side face of a casing of the gas turbine combustor to make the inside of the casing and the outside of the casing communicate with each other or shut off from each other; an ignition rod formed of a long rod including a spark discharge portion at a leading end, the ignition rod being capable of advancing to and retreating from the inside of a combustor liner provided in the casing from/to the outside of the casing through the shutoff valve; and a driving part which makes the ignition rod advance and retreat. And the ignition rod is pulled out to an outside of the shutoff valve to the casing when an ignition is finished in the gas turbine combustor, and the shutoff valve makes an inside of the casing and an outside of the casing shut off from each other.

First Embodiment

Figure 1:
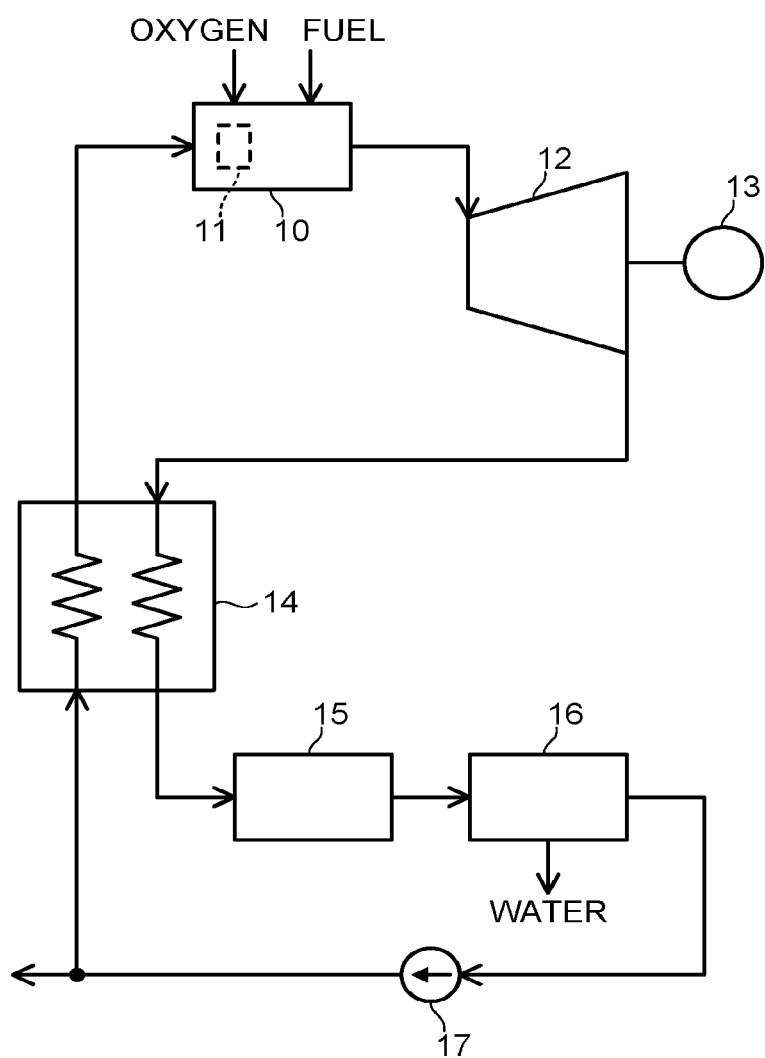
FIG. 1 is a system diagram of a thermal power generation system according to a first embodiment.

FIG. 1 is a system diagram of a thermal power generation system according to a first embodiment. In an example illustrated here, the thermal power generation system uses $CO_2$ (carbon dioxide) as a working fluid introduced into a combustor 10. As illustrated in FIG. 1, the thermal power generation system includes the combustor 10, a turbine 12, a generator 13, a heat exchanger 14, a cooler 15, a moisture separator 16, and a high-pressure pump 17. The combustor 10 includes an ignition device 11. The combustor 10 functions as a gas turbine combustor.

The combustor 10 burns a fuel and an oxidant to generate high-temperature combustion gas. A combustion reaction is started by the ignition by the ignition device 11. The fuel, oxygen, and high-pressure $CO_2$ are introduced into the combustor 10.

As the fuel, hydrocarbon such as methane or natural gas is used, for instance. As the fuel, a coal-gasified gas fuel containing carbon monoxide, hydrogen, and so on is also usable, for instance. As the oxidant, oxygen is used, for instance.

The high-pressure $CO_2$ introduced into the combustor 10 is a supercritical fluid at a supercritical pressure. The high-pressure $CO_2$ is obtained using partly circulated exhaust gas of the turbine 12.

Part of the high-pressure $CO_2$ is mixed with the oxygen being the oxidant, for instance. The rest of the high-pressure $CO_2$ is used as a cooling medium of a combustor liner or as a dilution medium that is to be introduced into the combustor liner, for instance. The combustor liner will be described later.

Here, in this thermal power generation system, it is preferable that the excessive oxidant (oxygen) or fuel does not remain in the combustion gas discharged from the combustor 10. Therefore, flow rates of the fuel and the oxygen are adjusted so that their mixture ratio becomes a stoichiometric mixture ratio (their equivalence ratio becomes 1). Note that the equivalence ratio mentioned here is an equivalence ratio (overall equivalence ratio) when it is assumed that the fuel and the oxygen are uniformly mixed.

The high-temperature combustion gas generated from the combustor 10 is introduced to the turbine 12. The introduced combustion gas does expansion work in the turbine 12 to rotate a turbine rotor. Then, the turbine 12 discharges the combustion gas ($CO_2$ and vapor) having finished the expansion work. Incidentally, the combustion gas discharged from the combustor 10 is introduced to the turbine 12 through, for example, a transition piece (not illustrated).

The generator 13 is disposed coaxially with the turbine 12, for instance. That is, the generator 13 is coupled to the turbine 12 coaxially. The generator 13 generates electricity in accordance with the rotation of the turbine 12.

The heat exchanger 14 deprives the combustion gas ($CO_2$ and vapor) discharged from the turbine 12 of heat by heat exchange. Then, the heat exchanger 14 gives the deprived heat to $CO_2$ that is to be circulated to the turbine 12. For example, supercritical $CO_2$ at about 700° C. is supplied to the combustor 10 as a result of this heat exchange.

The cooler 15 further cools the combustion gas deprived of heat by the heat exchanger 14. Then, it condenses the vapor in the combustion gas into water.

The moisture separator 16 separates the moisture from the combustion gas cooled by the cooler 15. Then, the moisture separator 16 discharges $CO_2$ (dry $CO_2$) from which the moisture has been separated. The moisture (water condensate) separated in the moisture separator 16 is discharged outside, for instance.

The high-pressure pump 17 compresses $CO_2$ from which the moisture has been separated by the moisture separator 16, to increase the pressure of $CO_2$. The compressed $CO_2$ becomes the supercritical $CO_2$. Most of the high-pressure $CO_2$ is circulated to the combustor 10 through the heat exchanger 14. The rest of the high-pressure $CO_2$ is supplied to other facilities, for instance.

Next, the operation in the thermal power generation system will be described.

When the fuel, the oxygen, and the high-pressure $CO_2$ obtained using the exhaust from the turbine 12 are introduced to the combustor 10 and the fuel and the oxygen burn, the high-temperature combustion gas is generated. The combustion gas is introduced to the turbine 12. Then, the combustion gas does the expansion work in the turbine 12 to rotate the turbine rotor through rotor blades. The generator 13 is driven by the rotation of the turbine rotor to generate electricity.

The combustion gas ($CO_2$ and the vapor) having finished the expansion work is discharged from the turbine 12. The combustion gas discharged from the turbine 12 is deprived of heat in the heat exchanger 14 and is introduced to the cooler 15. The combustion gas introduced to the cooler 15 is further cooled and its vapor condenses into water.

The combustion gas cooled by the cooler 15 is introduced to the moisture separator 16. Then, the moisture separator 16 separates the moisture from the combustion gas and discharges $CO_2$ from which the moisture has been separated. The $CO_2$ from which the moisture has been separated is increased in pressure by the high-pressure pump 17 to be the supercritical high-pressure $CO_2$.

Most of the high-pressure $CO_2$ passes through the heat exchanger 14 to be heated by the heat removed from the high-temperature combustion gas. The heated high-pressure $CO_2$ is circulated to the combustor 10. The rest of the high-pressure $CO_2$ is supplied to other device, for instance.

Here, the rest of the high-pressure $CO_2$ can be stored as high-purity high-pressure $CO_2$, for instance. This makes it possible to recover the high-purity high-pressure $CO_2$ without separately providing a facility (CCS) for separating and recovering $CO_2$. Further, the recovered high-pressure $CO_2$ is also usable for EOR (Enhanced Oil Recovery) used in an oil drilling site, for instance.

The above-described thermal power generation system is capable of performing the power generation simultaneously with the separation and recovery of $CO_2$. Further, in this thermal power generation system, an oxygen combustion circulation system using the supercritical-pressure $CO_2$ is configured. This thermal power generation system effectively uses $CO_2$ and thus can be a zero-emission system that does not discharge NOx.

Next, the combustor 10 including the ignition device 11 of the first embodiment will be described.

Figure 2:
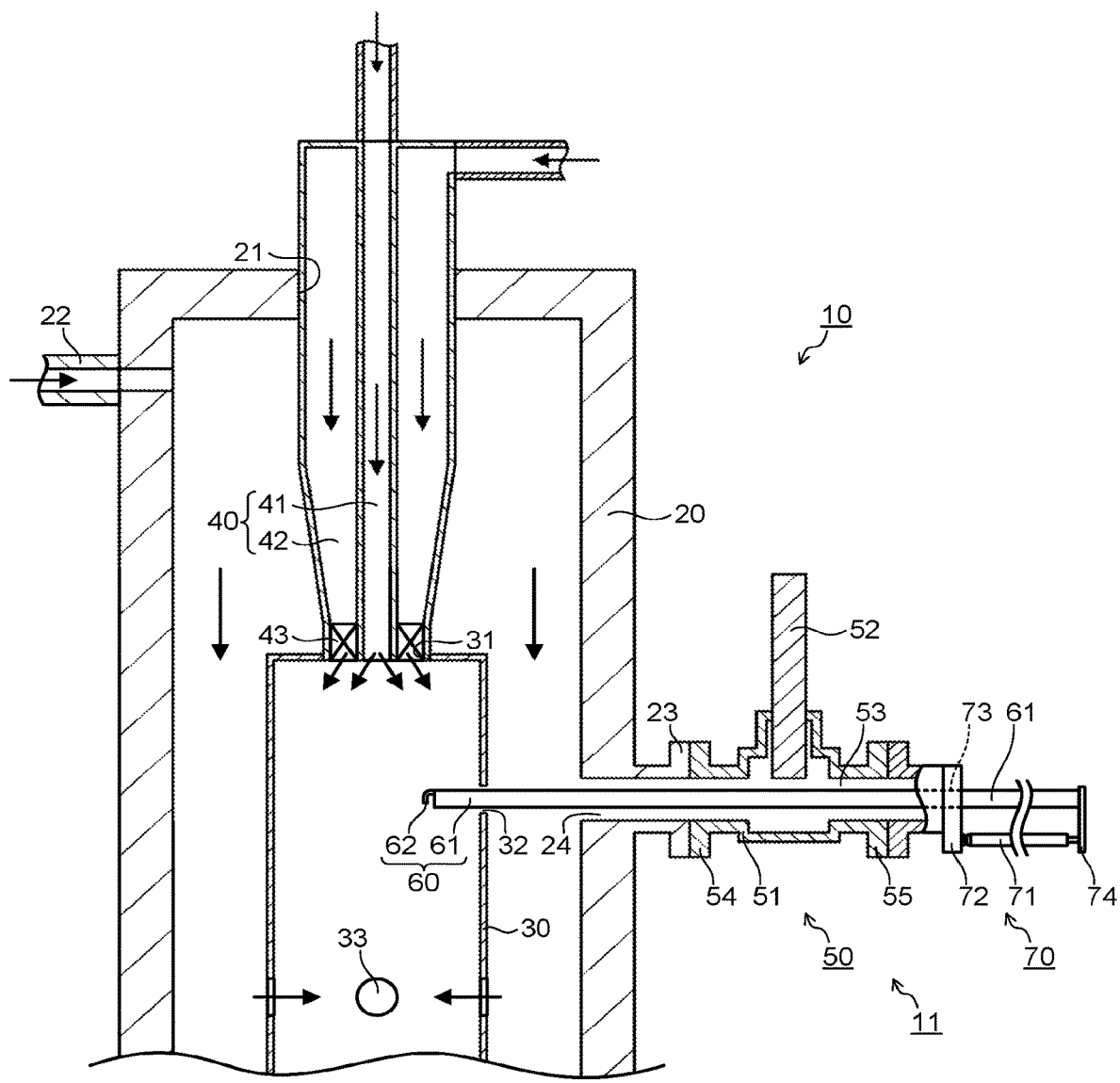
FIG. 2 is a view schematically illustrating a vertical cross section of a combustor including an ignition device of the first embodiment.

FIG. 2 is a view schematically illustrating a vertical cross section of the combustor 10 including the ignition device 11 of the first embodiment. Note that FIG. 2 illustrates a state of the ignition device 11 at the time of the ignition.

As illustrated in FIG. 2, the combustor 10 includes a casing 20, a combustor liner 30, a fuel and oxidant supply part 40, and the ignition device 11.

The casing 20 houses the combustor liner 30 and the fuel and oxidant supply part 40 therein. A closed end (head portion) of the casing 20 has an opening 21 to insert the fuel and oxidant supply part 40. At one end side of the casing 20, a pipe 22 through which the high-pressure $CO_2$ is introduced into the casing 20 is connected. The number of the pipes 22 is not limited to one, but the pipe 22 may be arranged in plurality in a circumferential direction. The pipe 22 functions as a working fluid supply part.

The casing 20 has, on its outer side face, a flange portion 23 to attach a shutoff valve 50 of the ignition device 11. The flange portion 23 has, at its center, a through hole 24 which penetrates through the casing 20. The inside of the casing 20 and the outside of the casing 20 are communicated with each other by the through hole 24. Incidentally, the casing 20 is constructed by the combination of components, not illustrated, into which the casing 20 is divided in a longitudinal direction of the combustor 10, for instance.

The combustor liner 30 is provided in the casing 20 at a predetermined interval from an inner wall surface of the casing 20. The combustor liner 30 is formed of, for example, a cylindrical body such as a circular cylinder having one end (head portion) closed and the other end opened. In the one end of the combustor liner 30, an opening 31 across which the fuel and oxidant supply part 40 faces the inside of the combustor liner 30 is formed. Through this opening 31, the fuel and the oxidant are introduced into the combustor liner 30 from the fuel and oxidant supply part 40.

In a side portion of the combustor liner 30, an insertion hole 32 through which an ignition rod 60 of the ignition device 11 is inserted into the combustor liner 30 is formed. This insertion hole 32 is formed at a position facing the through hole 24 of the casing 20.

Further, in a side portion more downstream than the insertion hole 32, a dilution hole 33 through which the high-pressure $CO_2$ introduced from the pipe 22 is introduced into the combustor liner 30 is formed, for instance. For example, on a side portion of the combustor liner 30, a hole for porous film cooling may be provided, though not illustrated in FIG. 2. In this case, the high-pressure $CO_2$ passes through the hole for porous film cooling to be introduced into the combustor liner 30.

A downstream end of the combustor liner 30 is coupled to, for example, the transition piece (not illustrated). The combustion gas discharged from the combustor liner 30 passes through the transition piece (not illustrated) to be introduced to the turbine 12.

The fuel and oxidant supply part 40 includes a fuel supply part 41 at its center and an annular oxidant supply part 42 provided around the fuel supply part 41. The fuel supply part 41 injects the fuel into the combustor liner 30. The oxidant supply part 42 injects the oxidant into the combustor liner 30. A flow of the injected oxidant has a rotational velocity component which is generated when the oxidant passes through, for example, a swirler 43 provided in the oxidant supply part 42.

Next, the ignition device 11 will be described.

As illustrated in FIG. 2, the ignition device 11 includes the shutoff valve 50, the ignition rod 60, and a driving part 70.

The shutoff valve 50 makes the inside of the casing 20 and the outside of the casing 20 communicate with each other or shut off from each other. The shutoff valve 50 includes a cylinder part 51 in a cylindrical shape and a shutoff part 52. The cylindrical part 51 includes, at its both ends, flange portions 54, 55 respectively, for instance. The flange portion 54 at one end is fixed to the flange portion 23 of the casing 20. The flange portion 55 at the other end is coupled to the driving part 70.

The shutoff part 52 closes a passage 53 in the cylindrical part 51. While the shutoff part 52 is opened, the inside of the casing 20 and the outside of the casing 10 communicate with each other. In this communicating state, the ignition rod 60 is capable of advancing to and retreating from the combustor liner 30 side through the inside of the cylindrical part 51. On the other hand, while the shutoff part 52 is closed, the inside of the casing 20 and the outside of the casing 20 are shut off from each other. In this shut off state, it is not possible to move the ignition rod 60 toward the combustor liner 30 beyond the shutoff part 52.

As the shutoff valve 50, a needle valve or a ball valve is usable, for instance. It should be noted that the shutoff valve 50 is not limited to these. As the shutoff valve 50, any valve that allows the ignition rod 60 to advance and retreat when the shutoff part 52 is opened is usable.

The ignition rod 60 includes a long rod portion 61 and a spark discharge portion 62 provided at a leading end of the rod portion 61. Voltage application to the spark discharge portion 62 causes spark discharge. This spark discharge starts the combustion reaction of the fuel and the oxygen introduced into the combustor liner 30. Incidentally, the spark discharge portion 62 is electrically connected to a voltage applying device (not illustrated). Further, the rod portion 61 functions as a rod.

The rod portion 61 is supported by the driving part 70, for instance. The operation of the driving part 70 enables the ignition rod 60 to advance and retreat in the cylindrical part 51 of the shutoff valve 50 and in the combustor liner 30.

The driving part 70 supports the rod portion 61 of the ignition rod 60 and includes, for example, an expandable/contractible cylinder 71 disposed in parallel to the supported rod portion 61. The rod portion 61 is supported by slidably penetrating through a through hole 73 of a rod guide 72, for instance. Further, on an inner surface of the through hole 73, a seal part (not illustrated) is provided to reduce the leakage of the high-pressure $CO_2$ and so on.

As illustrated in FIG. 2, a rear end of the rod portion 61 is fixed to a flat plate-shaped member 74, for instance. The expandable/contractible cylinder 71 is disposed between the rod guide 72 and the flat plate-shaped member 74. The expandable/contractible cylinder 71 causes the ignition rod 60 to advance and retreat by expanding and contracting in an axial direction of the ignition rod 60.

As the expandable/contractible cylinder 71, an air cylinder or a hydraulic cylinder is used, for instance. Here, a driving medium for the expandable/contractible cylinder 71 is preferably introduced from a system except the system of the thermal power generation system illustrated in FIG. 1, for instance. For example, a driving medium source for introducing the driving medium to the expandable/contractible cylinder 71 may be separately provided. This enables the driving of the expandable/contractible cylinder 71 without affected by an operation state of the thermal power generation system.

The expandable/contractible cylinder 71 is connected to the driving medium source though, for example, a pipe (not illustrated). The driving medium is introduced to the expandable/contractible cylinder 71 through this pipe, or the driving medium is introduced out of the expandable/contractible cylinder 71 through this pipe.

Next, the operation of the combustor 10 including the ignition device 11 of the first embodiment will be described with reference to FIG. 2 to FIG. 4.

Figure 3:
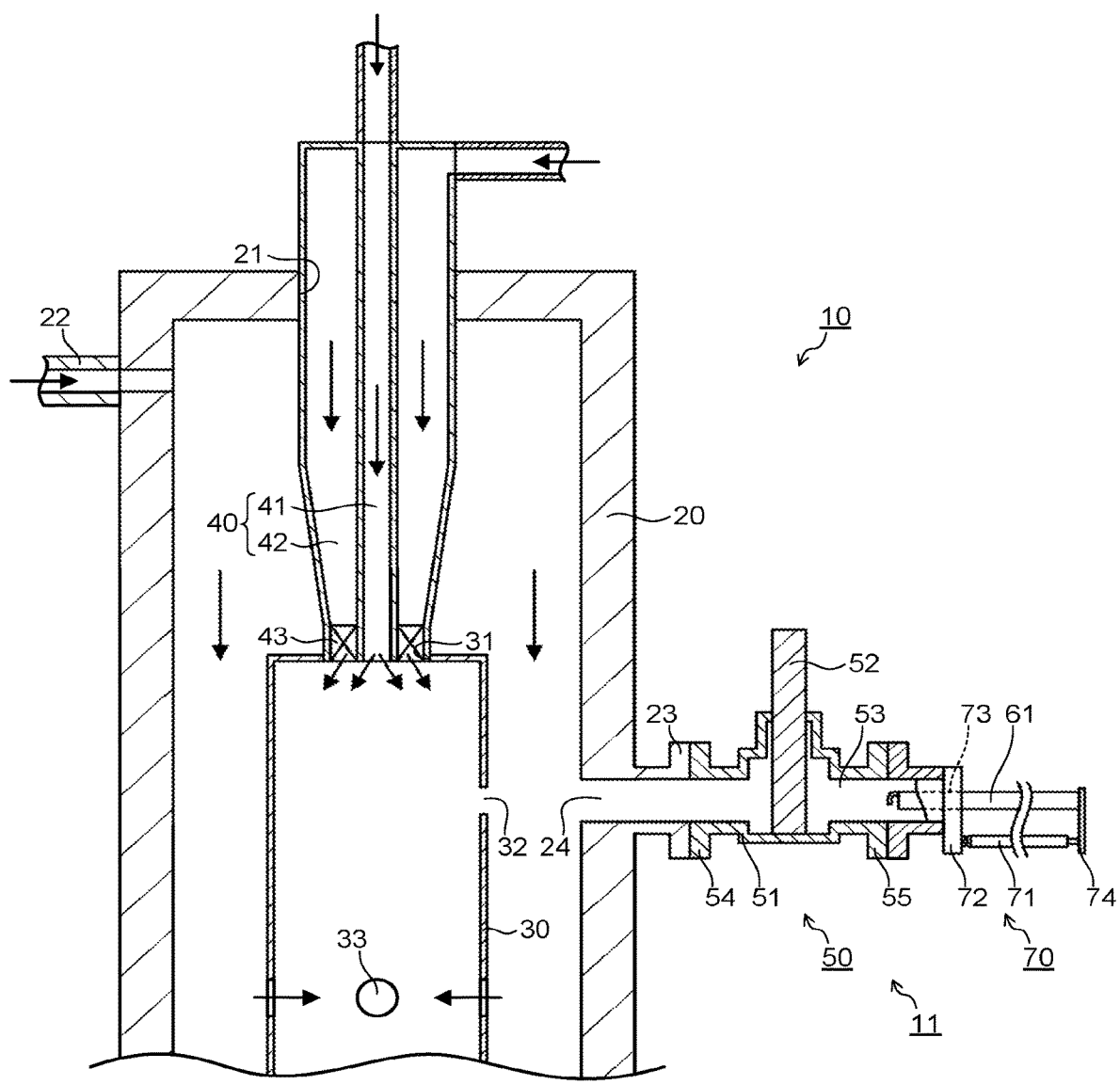
FIG. 3 is a view schematically illustrating a vertical cross section of the combustor including the ignition device of the first embodiment.

FIG. 3 is a view schematically illustrating a vertical cross section of the combustor 10 including the ignition device 11 of the first embodiment. Note that FIG. 3 illustrates a state where the shutoff part 52 of the shutoff valve 50 is closed. This state is exemplified as, for example, a state after the ignition is finished. Here, a position of the ignition rod 60 in the state where the shutoff part 52 is closed is called a standby position for convenience' sake.

Figure 4:
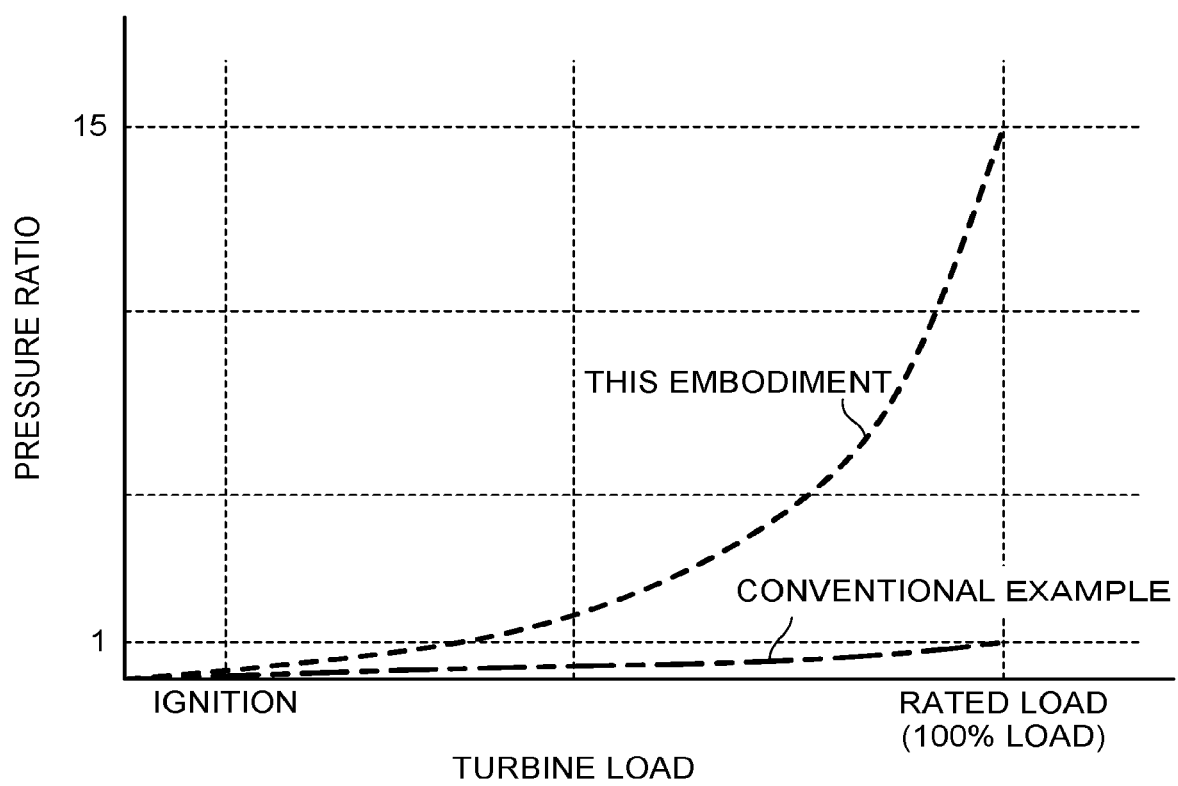
FIG. 4 is a chart illustrating a pressure ratio in the combustor including the ignition device of the first embodiment, under a varied turbine load.

FIG. 4 is a chart illustrating a pressure ratio in the combustor 10 including the ignition device 11 of the first embodiment under a varied turbine load. Note that FIG. 4 also illustrates a pressure ratio in a conventional gas turbine combustor for comparison. The vertical axis represents the pressure ratio when the pressure in the conventional combustor at the time of a rated load is set as 1.

At the time of the ignition in the combustor 10, the shutoff part 52 of the shutoff valve 50 is opened from the state illustrated in FIG. 3. Then, the expandable/contractible cylinder 71 is driven to make the spark discharge portion 62 of the ignition rod 60 pass through the inside of the cylindrical part 51, the insertion hole 24, and the insertion hole 32 and move up to a predetermined position in the combustor liner 30, as illustrated in FIG. 2.

Here, the predetermined position is a position where the accurate ignition is possible, for instance. Specifically, an example of the predetermined position is a downstream position in a recirculation zone formed in the combustor liner 30 by the flow of the oxidant at the time of the ignition.

Subsequently, the voltage is applied to the spark discharge portion 62 to cause the spark discharge. After the start of the spark discharge, the fuel and the oxidant are injected into the combustor liner 30 from the fuel supply part 41 and from the oxidant supply part 42 respectively. Then, the air-fuel mixture of the fuel and the oxygen is ignited by the spark discharge of the spark discharge portion 62 and the combustion reaction starts.

Note that the pressure in the combustor 10 at the time of the ignition is lower than the pressure in the conventional combustor at the time of the rated load as illustrated in FIG. 4. That is, the withstand pressure specification of an ignition device used in the conventional combustor is applicable to the ignition device 11.

After the completion of the ignition, the expandable/contractible cylinder 71 is driven to pull out the ignition rod 60 up to the standby position from the inside of the casing 20. That is, the ignition rod 60 is pulled out up to such a position that the spark discharge portion 62 is on an outer side than the shutoff part 52 (on the driving part 70 side).

After the ignition rod 60 is pulled out up to the standby position, the shutoff part 52 of the shutoff valve 50 is closed. This results in the state illustrated in FIG. 3. In the state where the shutoff part 52 is closed, the outer side (the driving part 70 side) than the shutoff part 52 and the inside of the casing 20 are shut off from each other. That is, the ignition rod 60 is not exposed to the inside of the casing 20, in other words, a pressure atmosphere field in the combustor 10. Accordingly, even if the pressure in the combustor 10 rises after the completion of the ignition and the pressure ratio becomes about 15 at the time of the rated load as illustrated in FIG. 4, the ignition rod 60 is not affected by the pressure in the combustor 10.

The high-pressure $CO_2$ introduced from the pipe 22 of the casing 20 flows between the casing 20 and the combustor liner 30 toward a downstream side (a downstream end side of the combustor liner 30). At this time, the high-pressure $CO_2$ flows while cooling the combustor liner 30. Then, the high-pressure $CO_2$ is introduced into the combustor liner 30 through, for example, the dilution hole 33 of the combustor liner 30.

As described above, according to the ignition device 11 of the first embodiment, owing to the shutoff valve 50, it is possible to shut off the inside of the casing 20 and the outside of the casing 20 from each other. Further, after the completion of the ignition, it is possible to pull out the ignition rod 60 up to the position where the ignition rod 60 is on the outer side (on the driving part 70 side) than the shutoff part 52 of the shutoff valve 50. Then, the ignition rod 60 is not exposed to the pressure atmosphere field in the combustor 10 by closing the shutoff part 52.

Therefore, in the ignition device 11 of the first embodiment, even if the pressure in the combustor at the time of the turbine rated load becomes ten time or more as high as the pressure in the conventional gas turbine combustor, the withstand pressure specification of the ignition device in the conventional gas turbine combustor is applicable.

Second Embodiment

Figure 5:
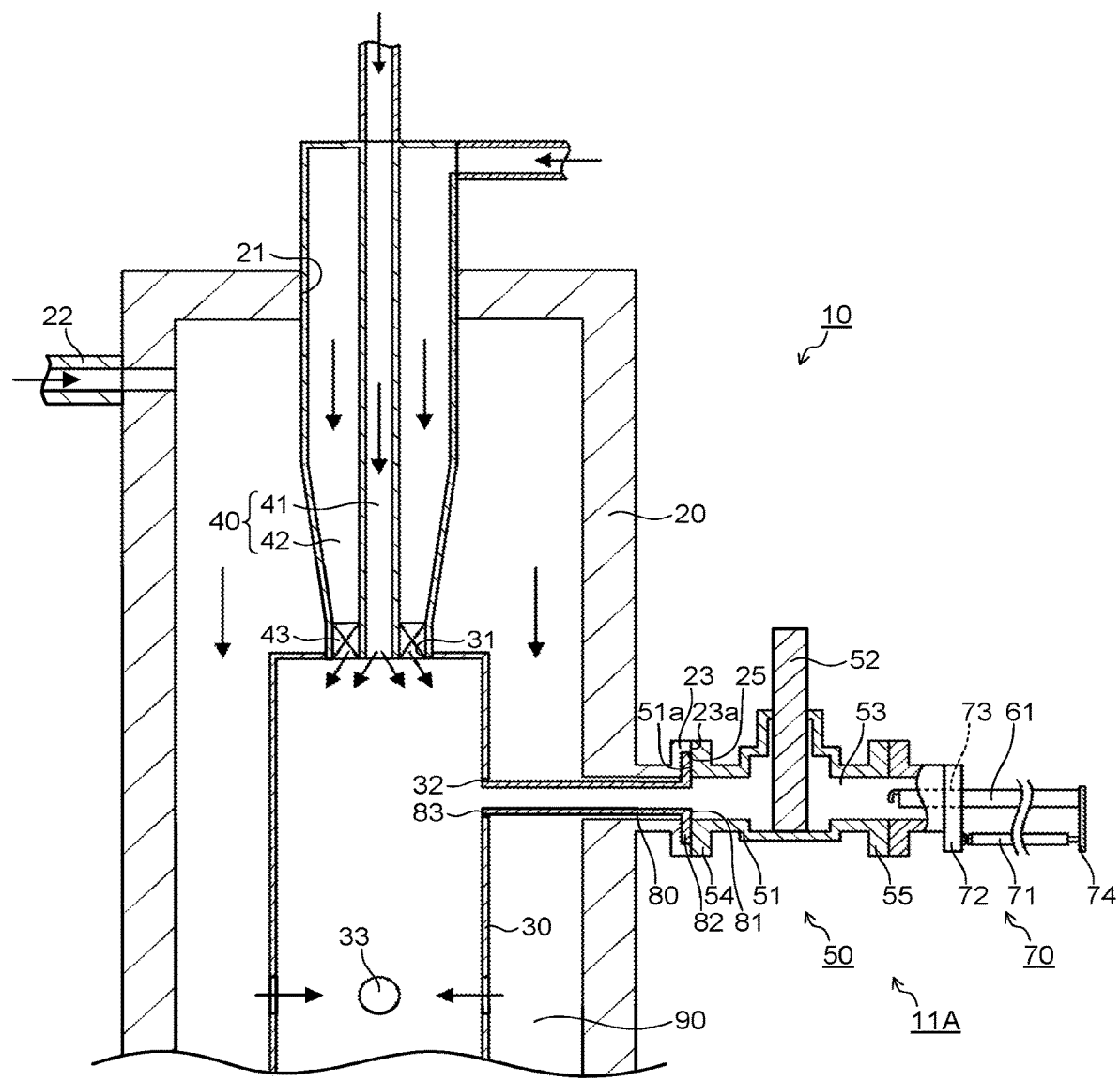
FIG. 5 is a view schematically illustrating a vertical cross section of a combustor including an ignition device of a second embodiment.

FIG. 5 is a view schematically illustrating a vertical cross section of a combustor 10 including an ignition device 11A of a second embodiment. Note that FIG. 5 illustrates a state where a shutoff part 52 of a shutoff valve 50 is closed. Note that the same component parts as those of the combustor 10 including the ignition device 11 of the first embodiment are denoted by the same reference signs, and redundant description thereof will be omitted or simplified.

The structure of the ignition device 11A of the second embodiment is the same as that of the ignition device 11 of the first embodiment except that it includes a sleeve 80. Therefore, the different structure will be mainly described here.

As illustrated in FIG. 5, the ignition device 11A includes the shutoff valve 50, the ignition rod 60, the driving part 70, and the sleeve 80.

The sleeve 80 extends from an end portion front edge snubber 51a of the shutoff valve 50 (cylindrical part 51) on the casing 20 side to the insertion hole 32 of the combustor liner 30. The sleeve 80 is formed of a tubular member having both ends opened. This tubular member is made of, for example, heat-resistant metal.

The sleeve 80 includes a flange portion 82, for example, spreading in a radial direction of the tube, on its end portion 81 on the shutoff valve 50 side. The flange portion 82 is sandwiched between the flange portion 23 of the casing 20 and the flange portion 54 of the cylindrical part 51 as illustrated in FIG. 5, for instance. Consequently, the sleeve 80 is fixed. Incidentally, for facilitating the alignment of the flange portion 82, a groove 25 to fit the flange portion 82 may be provided in an end surface 23a of the flange portion 23 of the casing 20 as illustrated in FIG. 5.

An end portion 83 of the sleeve 80 on the combustor liner 30 side is fit in the insertion hole 32 of the combustor liner 30, for instance. In this case, it is preferable that the end portion 83 does not protrude into the combustor liner 30. It should be noted that this end portion 83 does not necessarily have to be fit in the insertion hole 32. An example of an alternative structure may be that the end portion 83 is larger in outside diameter than the insertion hole 32 and the end portion 83 abuts on the combustor liner 30 from the outer side so as to cover the periphery of the insertion hole 32. That is, it suffices that the end portion 83 obstructs the flow of the high-pressure $CO_2$ flowing into the combustor liner 30 through the insertion hole 32.

Consequently, the flow rate of the high-pressure $CO_2$ flowing into the combustor liner 30 through the insertion hole 32 becomes very small. Incidentally, it is more preferable that no high-pressure $CO_2$ flows into the combustor liner 30 through the insertion hole 32.

At the time of the ignition in the combustor 10 by the ignition device 11A including such a sleeve 80, the ignition rod 60 is moved through the inside of the cylindrical part 51 of the shutoff valve 50 and the inside of the sleeve 80 so that the spark discharge portion 62 is located at the predetermined position in the combustor liner 30.

After the completion of the ignition, the ignition rod 60 is pulled out to such a position that the spark discharge portion 62 is located on an outer side (on a driving part 70 side) than the shutoff part 52. Then, the shutoff part 52 is closed as illustrated in FIG. 5.

In the combustor 10, the high-pressure $CO_2$ introduced from the pipe 22 of the casing 20 flows in a space 90 between the casing 20 and the combustor liner 30 toward the downstream side (the downstream end side of the combustor liner 30). At this time, since the end portion 83 of the sleeve 80 is fit in the insertion hole 32, the flow rate of the high-pressure $CO_2$ flowing into the combustor liner 30 through the insertion hole 32 is very small. That is, the flow rate of the high-pressure $CO_2$ flowing through the insertion hole 32 into the recirculation zone formed in the combustor liner 30 is very small.

Therefore, it is possible to prevent the high-pressure $CO_2$ from disturbing a flow field in the recirculation zone. Consequently, the optimum combustion reaction and flame holding performance are maintained.

As described above, according to the ignition device 11A of the second embodiment, owing to the sleeve 80, it is possible to reduce the flow rate of the high-pressure $CO_2$ flowing into the combustor liner 30 through the insertion hole 32. Consequently, the optimum combustion reaction and flame holding performance are maintained.

The operation and effect that the ignition device 11A of the second embodiment has by including the shutoff valve 50 are the same as those in the ignition device 11 of the first embodiment.

Here, in the above-described thermal power generation system, the example where $CO_2$ (carbon dioxide) being the supercritical fluid is used as the working fluid introduced into the combustor is described, but air or the like may be used as the working fluid.

According to the above-described embodiments, it is possible to apply a withstand pressure specification of an ignition device in a conventional gas turbine combustor, in the thermal power generation system using the supercritical-pressure working fluid.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ignition device provided to a gas turbine combustor to which a working fluid is introduced, the ignition device comprising:
    a shutoff valve provided on an outer side face of a casing of the gas turbine combustor to make an inside of the casing and an outside of the casing communicate with each other or shut off from each other;
    an ignition rod formed of a long rod including a spark discharge portion at a leading end, the ignition rod being capable of advancing to and retreating from an inside of a combustor liner provided in the casing from/to the outside of the casing through the shutoff valve; and
    a driving part which makes the ignition rod advance and retreat,
    wherein the ignition rod is pulled out to an outside of the shutoff valve to the casing when an ignition is finished in the gas turbine combustor, and the shutoff valve makes the inside of the casing and the outside of the casing shut off from each other.

2. The ignition device according to claim 1, further comprising a tubular sleeve which is provided between an end portion of the shutoff valve on the casing side and an insertion hole formed in a side portion of the combustor liner to have the ignition rod inserted therethrough, and in which the ignition rod advances and retreats.

3. A gas turbine combustor to which a working fluid is introduced, the gas turbine combustor comprising:
    a casing;
    a combustor liner provided in the casing;
    a fuel supply part provided on a head portion side of the combustor liner to inject a fuel into the combustor liner;
    an oxidant supply part which injects an oxidant into the combustor liner from around the fuel supply part;
    a working fluid supply part which supplies the working fluid to a space between the casing and the combustor liner;
    a shutoff valve provided on an outer side face of the casing to make an inside of the casing and an outside of the casing communicate with each other or shut off from each other;
    an ignition rod formed of a long rod including a spark discharge portion at a leading end, the ignition rod being capable of advancing to and retreating from the inside of the casing from/to an outside of the combustor liner; and
    a driving part which makes the ignition rod advance and retreat,
    wherein the ignition rod is pulled out to an outside of the shutoff valve to the casing when an ignition is finished in the gas turbine combustor, and the shutoff valve makes the inside of the casing and the outside of the casing shut off from each other.

4. The gas turbine combustor according to claim 3, further comprising a tubular sleeve which is provided between an end portion of the shutoff valve on the casing side and an insertion hole formed in a side portion of the combustor liner to have the ignition rod inserted therethrough, and in which the ignition rod advances and retreats.

* * * * *